United States Patent Office 3,393,609
Patented July 23, 1968

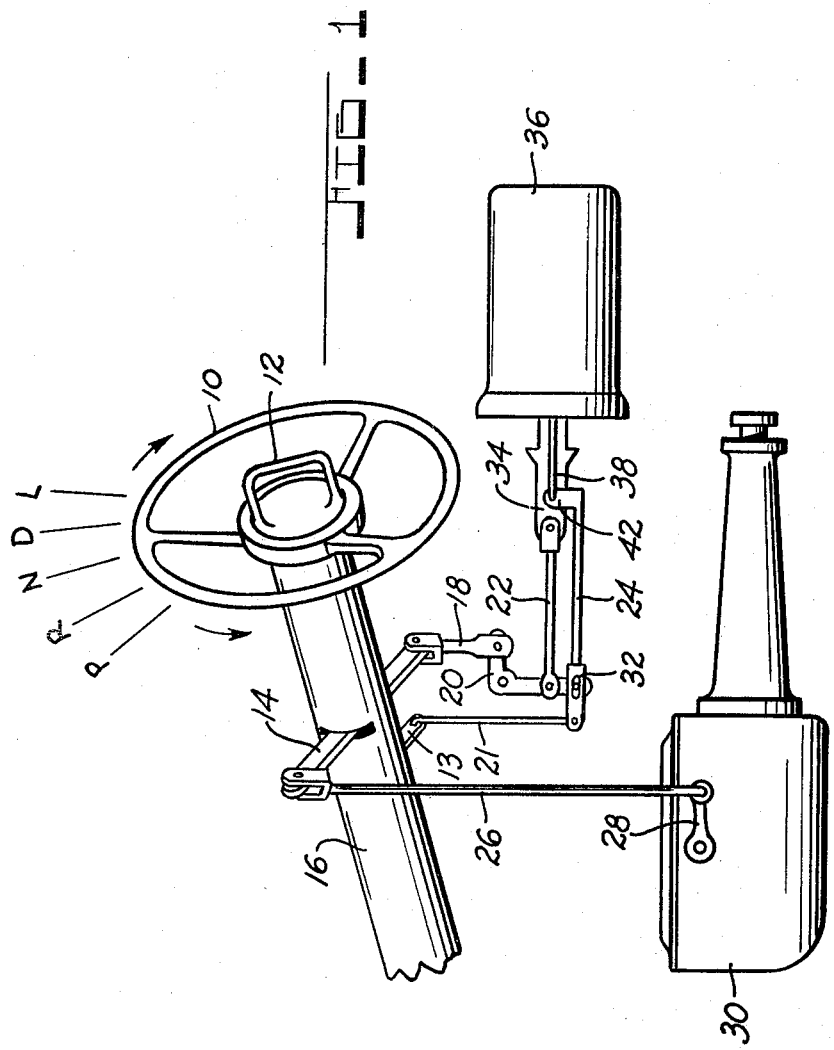
MAXWELL L. CRIPE.
ROBERT R. HAGER.
INVENTOR.
BY Richard G. Seib
ATTORNEY.

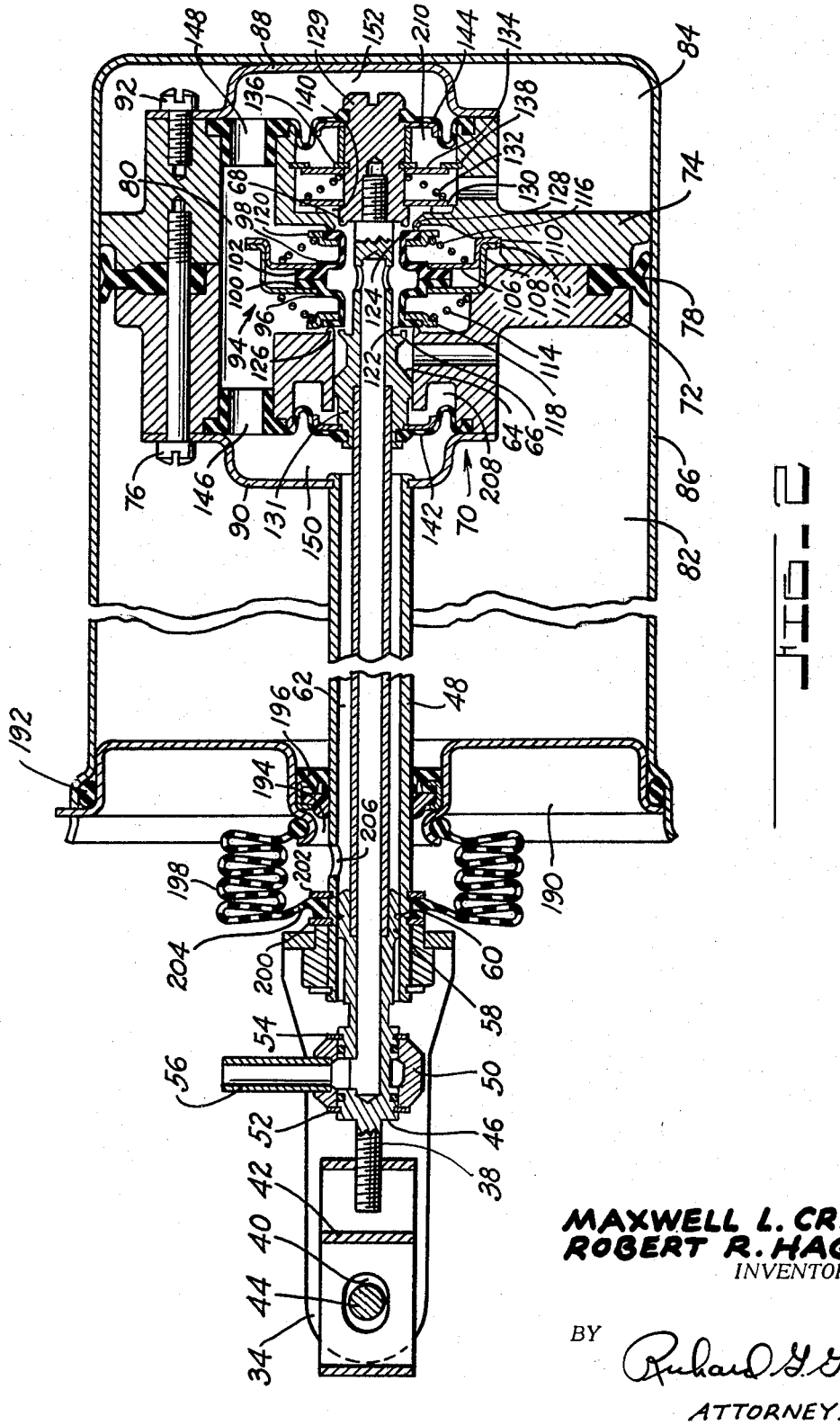

1

3,393,609
DOUBLE ACTING FLUID PRESSURE
SERVOMOTOR
Maxwell L. Cripe and Robert R. Hager, South Bend, Ind.,
assignors to The Bendix Corporation, a corporation of
Delaware
Filed Dec. 29, 1966, Ser. No. 605,868
11 Claims. (Cl. 91—376)

ABSTRACT OF THE DISCLOSURE

A vacuum operated double acting servomotor mechanism controlled by a manually operated three-way valve which is carried internally of the piston for the servomotor.

SUMMARY

It is an object of this invention to provide a servomotor with a piston means which is double acting to produce fore and aft forces.

It is another object of this invention to provide the piston of the aforementioned servomotor with a self-contained valve means which is adapted to be actuated in a fore and aft direction to control the actuation of the piston.

A further and more detailed object of this invention is to provide a double acting servomotor with a piston having a valve chamber therein containing a resilient poppet biased against valve seats thereof with a valve plunger having facing valve seats to either side of the poppet slidably received by the piston internally of the poppet so that actuation in either direction will unseat the poppet to create the desired pressure differential across the piston in the desired direction and vice versa.

DRAWING DESCRIPTION

FIGURE 1 is a schematic illustration of a double acting servomotor in a vehicle for actuating the transmission thereof; and FIGURE 2 is a cross sectional detail of a double acting servomotor designed in accordance with the principles of this invention.

DETAILED DESCRIPTION

With reference to FIGURE 1 there is shown a vehicle steering wheel 10 having a gear shift selector 12 centrally disposed therein that is connected to an arm 13 projecting radially from the steering column 16 which is in turn connected to a link 21 connected with another link 24. A lever mechanism comprising a link 18, a bell crank 20 and a link 22 is connected to one end of an arm 14 and a link 26 is connected to the other end of the arm 14 to connect it with a gear shift selector lever 28 on the transmission 30. The link 24 is connected by means of a lost motion connection 32 to bellcrank 20. A force transmitting rod 34 of a servomotor 36 is fixedly connected to the bellcrank 20. The rod as will later be seen has a lost motion connection with a valve actuating plunger 38 of the double acting servomotor 36.

With reference now to FIGURE 2, it will be appreciated that the link 24 is connected to the valve actuating rod 38 by means of a lost motion connection 40 between the end 42 of the link 24 which includes a pin 44 that is affixed to the force transmitting rod 34 to permit valve actuation within the servomotor first before manual actuation of the force transmitting rod 34.

As will be seen, the end 42 of the link 24 is threaded onto a tubular projection 46 that is slidably received within the tubular portion 48 of the force transmitting rod 34. An adapter 50 is held by means of snap rings 52 and 54 about a cross drilled passage in the tubular member 46 and has a fitting 56 for connection with a vacuum source such as the engine intake manifold (not shown) of the vehicle's power plant. The tubular member 46 is guided within the tubular force transmitting rod 48 by means of a guide 58 at the left end, as viewed in the drawing which incorporates a groove 60 to maintain a lubricant between the tubular members 46 and 48 at that end. The other end of the tubular member 46 is guided by means of a flange 64 on a valve plunger comprising facing, and spaced valve seats 66 and 68. The valve plunger is sealingly affixed to the tubular member 46 and includes a left portion and a right portion, as viewed in the drawing, that are preassembled by screwing together. The guiding flange 64 is slidably received within a bore of a piston 70 comprised of two sections 72 and 74 joined together by a bolt 76 with a peripheral seal 78 interposed. Both the left and right portions 72 and 74 are hollow to have a valve chamber 80 internally of the piston which is closed from chambers 82 and 84 within the housing 86 by means of caps 88 and 90 that are held to the respective face of the portions 74 and 72 of the piston 70 by a bolt 92 and the bolt 76.

In preassembling the piston 70, it should be noted that a poppet valve structure 94 is inserted between the portions 72 and 74 prior to their assembly. This poppet valve 94 comprises annular rubber pieces 96 and 98 having flanges 100 and 102 clamped together by plates 106 and 108 that are press fitted together to have their radial ears 110 and 112 abutting a shoulder of the portion 74 of the piston 70 after assembly. Two springs, 114 and 116, are inserted upon the preassembly of the valve 94 between the retainer plates 108 and 106 and reinforcing rings 118 and 120 that are bonded or formed with valve flanges 122 and 124 of the annular pieces 96 and 98 to bias the valve flanges onto valve seats 126 and 128, respectively, formed on the portions 72 and 74 in the valve chamber 80.

End 129 of the valve plunger is then preassembled to the piston having a plate 130 on a shoulder thereof behind the valve seat 68 with a spring 132 compressed between this plate and a retainer plate 134 that is held by a snap ring 136 to provide a caged spring assembly. The end 129 is then inserted within the respective cavity of the portion 74 of the piston 70 until a retainer ring 138 can be fitted within a recess of the portion 74 of the piston 70 so that the plate 130 bears against spaced projections 140 on the portion 74. Next the end 131 is screwed into the end 129 to join the valve plunger in one piece internally of the piston with the valve seats spaced on either side of the respective flanges of the valve 94. To each end 131 and 129 of the valve plunger, diaphragms 142 and 144 have their central openings snap fitted to recess in the respective ends with diaphragm support plates immediately therebehind. The peripheral portions of the diaphragms 142 and 144 are secured in recesses in the portions 72 and 74 of the piston 70 by joining the ends 90 and 88 to close the valve chamber 80. The diaphragms 142 and 144 are each provided with axial openings 146 and 148, respectively to communicate end chambers 150 and 152 to the valve chamber 80 thereby communicating the passage 62 to the valve chamber 80 about the valve 94.

The housing 86 is preferably of open end construction that is closed by a cover 190 that is affixed to the open end having a seal 192 compressed between the cover and a raised portion of the open end of the housing to maintain the integrity of the chambers 82 and 84 therein. The cover 190 is provided with openings 194 in which a seal means 196 is placed to sealingly guide the tubular force transmitting rod 48 that projects therethrough. In order to prevent contaminants from entering the servomotor a rubber boot 198 is affixed at one end to the cover and at the other end between snap rings 200 and 202 to the tubular force transmitting rod 48. This rubber boot 198 is also provided with radially spaced openings 204 to permit atmosphere surrounding the servomotor to communicate with the area internally of the boot 198. A filter may be provided internally of the boot 198 over an opening 206 through the rod 48 leading to the passage 62. As noted from the drawing, the tubular valve plunger 46 is open to a passage within the end 131 that is cross drilled to exit internally of the valve 94 and thereby communicate in the normal non-actuated condition with chambers 208 and 210 behind, respective, the diaphragms 142 and 144.

OPERATION

In operation the operator of the vehicle upon desiring to change gears will grip the gear shift selector 12 to rotate it to the gear position desired whereby the end 42 of the link 24 will actuate the valve plunger to abut either seat 66 or 68 on the respective valve flange 122 or 124 and further motion will unseat the respective valve flange from either seat 126 or 128 to open valve chamber 80 to either chamber 208 or 210 and at the same time chamber 80 is communicated to either chamber 82 or 84 of the servomotor. After the valve is open, the lost motion in the connection 40 of the end 42 with the force transmitting rod 34 is taken up whereby further force will also manually displace the force transmitting rod 34 and the piston 70. As the operator reaches the desired gear, the gear selector will stop and the pressure differential across the piston 70 will diminish until the respective valve flange 122 or 124 is again on the respective seat 126 or 128 of the piston portions 72 and 74.

During the actuation either the diaphragm 142 or the diaphragm 144 will have a pressure differential across it to provide a proportionate amount of feel to the operator of the gear selector 12.

The lost motion connection 32 will permit manual actuation in the event of power failure.

Having fully described a preferred embodiment of my invention in the operation thereof, it is now desired to set forth the intended protection sought by these Letters Patent as follows.

We claim:
1. A vacuum operated double acting servomotor comprising a housing:
   a double acting piston operatively arranged in said housing, said piston having a force transmitting rod projecting through said housing and provided with an internal valve chamber open on each side of said piston to respective chambers of said housing on opposite sides of said piston; and
   a valve means for controlling said chambers on opposite sides of said piston including a valve plunger having spaced valve seats facing each other, a tubular valve poppet operatively arranged between facing valve seats on said piston in said valve chamber about said valve plunger inwardly of the valve seats thereon, and mounting means on each side of said piston for operatively connecting said valve plunger thereto while permitting relative motion therebetween, each of said valve seats of said piston being located inwardly of the respective openings of said valve chamber to the respective chambers on each side of said piston.

2. The structure of claim 1 and further comprising a caged spring in said valve chamber operatively connected to said valve plunger to normally center the valve seats of the plunger spaced from said poppet.

3. The structure of claim 2 wherein said valve poppet is a tubular body resiliently biased to have valve flanges at each end thereof normally on the valve seats of said piston to divide said valve chamber into inner and outer portions.

4. The structure of claim 3 wherein said force transmitting rod is tubular and said valve plunger has a tubular member internally of the tubular force transmitting rod, which tubular force transmitting rod is open to said outer portion of said valve chamber and said tubular member communicates with said inner chamber.

5. The structure of claim 4 wherein said means mounting said valve plunger on each side of said piston includes flexible walls on each face of the piston having their outer areas subject to fluid pressure in said outer portion of said valve chamber and their inner areas subject to fluid pressure in said inner portion of said valve chamber.

6. The structure of claim 5 and comprising lost motion connecting means connecting said tubular force transmitting rod and said tubular member whereby operation of said tubular member in either direction will first lap the respective valve seat on the valve plunger with the respective valve flange of said valve poppet and thereafter remove said respective valve flange from its respective seat on said piston to thereby open said outer portion of said valve chamber to the opening adjacent said respective valve seat of said piston creating a pressure differential across said piston acting in the direction of movement of said tubular member whereafter further motion of said tubular member in the same direction actuates said tubular force transmitting rod in the same direction until the pressure differential across the flexible wall adjacent the non-actuated valve flange with the assistance of said caged spring recenters said valve plunger with respect to said poppet whereupon said poppet returns to its normal position and actuation of said piston is stopped.

7. The structure of claim 6 with additional means to communicate vacuum to said tubular member and atmospheric pressure is communicated to said tubular force transmitting rod.

8. A valve means for use in a double acting servomotor having a piston formed with an internal valve chamber, said valve means comprising:
   a valve plunger having facing valve seats intermediate its ends slidably arranged in said valve chamber;
   a grommet valve biased against facing valve seats on said piston intermediate and about said facing valve seats of said valve plunger; and
   flexible walls connected to each end of said valve plunger behind said valve seats thereon and to the piston to divide said valve chamber into an axial chamber about said plunger and internally of said grommet valve and end chambers communicated by fluid passage means open to the exterior of said grommet valve.

9. The structure of claim 8 wherein said grommet valve has at each end valve flanges of resilient material to insure seating with respect to both the valve seats of said plunger and of said piston.

10. The structure of claim 9 wherein said grommet valve has spring means thereabout to normally bias the end valve flanges outwardly.

11. The structure of claim 8 wherein said grommet valve includes back-to-back rubber members sealingly joined centrally by an annular retainer, a reinforcing ring on each end bonded to valve flanges thereat, and spring means on each side of said retainer to bias said valve flanges outwardly from each other.

References Cited

UNITED STATES PATENTS

| | | | |
|---|---|---|---|
| 1,848,923 | 3/1932 | Almen | 91—376 |
| 1,934,691 | 11/1933 | Baker | 91—376 |
| 2,012,861 | 8/1935 | Woolson | 91—376 |
| 2,735,268 | 2/1956 | Stelzer | 91—376 |

PAUL E. MASLOUSKY, *Primary Examiner.*